US007913229B2

(12) United States Patent
Squires et al.

(10) Patent No.: US 7,913,229 B2
(45) Date of Patent: Mar. 22, 2011

(54) COMPUTER-IMPLEMENTED SYSTEM FOR GENERATING AUTOMATED TESTS FROM A WEB APPLICATION

(75) Inventors: Charles W. Squires, Kernersville, NC (US); William A. Gwaltney, Jr., Durham, NC (US); Jared Richardson, Morrisville, NC (US)

(73) Assignee: SAS Institute Inc., Cary, NC (US)

( * ) Notice: Subject to any disclaimer, the term of this patent is extended or adjusted under 35 U.S.C. 154(b) by 1023 days.

(21) Appl. No.: 11/522,710

(22) Filed: Sep. 18, 2006

(65) Prior Publication Data

US 2008/0127094 A1 May 29, 2008

(51) Int. Cl.
*G06F 9/44* (2006.01)

(52) U.S. Cl. ....................... 717/124; 717/126
(58) Field of Classification Search ........... 717/124–126
See application file for complete search history.

(56) References Cited

U.S. PATENT DOCUMENTS

| | | |
|---|---|---|
| 5,086,393 A | 2/1992 | Kerr et al. |
| 5,475,843 A | 12/1995 | Halviatti |
| 5,528,735 A | 6/1996 | Strasnick et al. |
| 5,566,291 A | 10/1996 | Boulton et al. |
| 5,669,000 A | 9/1997 | Jessen et al. |
| 5,724,262 A | 3/1998 | Ghahramani |
| 5,892,947 A | 4/1999 | DeLong et al. |
| 5,905,856 A | 5/1999 | Ottensooser |
| 6,002,869 A | 12/1999 | Hinckley |
| 6,031,990 A | 2/2000 | Sivakumar et al. |
| 6,219,839 B1 | 4/2001 | Sampsell |
| 6,222,557 B1 | 4/2001 | Pulley, IV et al. |
| 6,237,138 B1 | 5/2001 | Hameluck et al. |
| 6,259,451 B1 | 7/2001 | Tesler |
| 6,301,579 B1 | 10/2001 | Becker |
| 6,326,985 B1 | 12/2001 | Tazoe et al. |
| 6,400,366 B1 | 6/2002 | Davies et al. |
| 6,405,364 B1 | 6/2002 | Bowman-Amuah |
| 6,449,744 B1 | 9/2002 | Hansen |
| 6,480,194 B1 | 11/2002 | Sang'udi et al. |
| 6,513,154 B1 * | 1/2003 | Porterfield ................... 717/101 |
| 6,526,526 B1 | 2/2003 | Dong et al. |
| 6,529,216 B1 | 3/2003 | Moore et al. |
| 6,694,288 B2 | 2/2004 | Smocha et al. |
| 6,725,399 B1 | 4/2004 | Bowman |
| 6,775,819 B1 | 8/2004 | Hardikar et al. |
| 6,792,460 B2 | 9/2004 | Oulu et al. |
| 6,842,176 B2 | 1/2005 | Sang'udi et al. |
| 6,898,556 B2 | 5/2005 | Smocha et al. |

(Continued)

OTHER PUBLICATIONS

John Ganci, "Rational Application Developer V6 Programming Guide", Jun. 2, 2005, IBM Redbooks, pp. 5, 509-512, and 1093-1097.*

(Continued)

*Primary Examiner* — Wei Y Zhen
*Assistant Examiner* — Chung Cheng
(74) *Attorney, Agent, or Firm* — Jones Day

(57) ABSTRACT

A method for testing software includes the steps of creating a software program using a software development program executing on a first computer; the first computer generating a source code file from the software program for testing; receiving the source code file by a second computer, the second computer executing a test generation program that is independent of the software development program; and executing the test generation program to generate a test file from the source code file.

9 Claims, 9 Drawing Sheets

U.S. PATENT DOCUMENTS

| | | | |
|---|---|---|---|
| 6,907,382 | B2 | 6/2005 | Urokohara |
| 7,068,267 | B2 | 6/2006 | Meanor et al. |
| 7,082,381 | B1 | 7/2006 | Saghier et al. |
| 7,197,370 | B1 | 3/2007 | Ryskoski |
| 7,222,265 | B1 | 5/2007 | LeSuer et al. |
| 7,237,231 | B2 * | 6/2007 | Lambert ............... 717/127 |
| 7,313,564 | B2 | 12/2007 | Melamed et al. |
| 7,577,769 | B2 | 8/2009 | Cobb et al. |
| 2001/0028359 | A1 | 10/2001 | Muraishi et al. |
| 2002/0029377 | A1 | 3/2002 | Pavela |
| 2003/0135843 | A1 | 7/2003 | Sluiman et al. |
| 2004/0107415 | A1 | 6/2004 | Melamed et al. |
| 2004/0139385 | A1 | 7/2004 | Sakaue |
| 2005/0015666 | A1 | 1/2005 | Kamani et al. |
| 2005/0154557 | A1 | 7/2005 | Ebert |
| 2005/0210397 | A1 | 9/2005 | Kanai et al. |
| 2005/0229043 | A1 | 10/2005 | Nasuti et al. |
| 2005/0240618 | A1 | 10/2005 | Nickerson et al. |
| 2005/0283736 | A1 | 12/2005 | Elie |
| 2006/0265368 | A1 | 11/2006 | Nickerson et al. |
| 2006/0265492 | A1 | 11/2006 | Morris |
| 2007/0027652 | A1 | 2/2007 | Hosagrahara |
| 2007/0083854 | A1 | 4/2007 | Mayer-Ullmann et al. |
| 2008/0127101 | A1 * | 5/2008 | Anafi et al. ............... 717/125 |

OTHER PUBLICATIONS

Hamill, "Unit Test Frameworks," Nov. 2, 2004, O'Reilly Media, Inc., Chapter 3.*

Buwalda, Hans et al., "Getting Automated Testing Under Control," Software TEsting & Quality Engineering, pp. 39-44 [Nov./Dec. 1999].

Buwalda, Hans, "It can be complicated to automate model-based testing. Here's how to employ action words to get the job done.", STQE Magazine, Software Quality Engineering, pp. 42, 44, 46-47 [Mar./Apr. 2003].

Walker, Mark H. et al., "Microsoft Office Visio 2003 Inside Out", Microsoft Press, 3 pp. [Oct. 29, 2003].

"WHEN-D4.2 Test Automation Approach", B-K Medial Group, Issue 1.0, pp. 1-14 [Jul. 5, 2000].

"Java Static Analysis, Code Review, Unit Testing, Runtime Error Detection", http://www.parasoft.com/jsp/products/jtest.jsp;jsessionid=aaacAMw30bA6G4?ITEMId=14, 1pg. (Jul. 20, 2009).

"Parasoft Jtest—Now Available With Test Case Sniffer", http://web.archive.org/web/20060404223614/http://parasoft.com/jsp/products/home.jsp?jproduct=Jtest, 4 pp. (Apr. 4, 2006).

Dockendorf, Scott, "Unit Testing and Generating Source Code for Unit Test Frameworks Using Visual Studio 2005 Team System", http://microsoft.com/en-us/library/ms364064(VS.80,printer).aspx, 13 pp. (Sep. 2005).

Nasuti, William John et al., U.S. Appl. No. 10/811,789, filed Mar. 29, 2004 entitled "System and Method for Software Testing".

Crowther, David C. et al., "Examining Software Testing Tools", Dr. Dobb's The World of Software Development, Jun. 1, 2005, http://www.drdobbs.com/article/printableArticle.jhtml;jsessionid=SM10XVYYWBKKFQE1GHRSKHWA..., printed on Sep. 22, 2010 (9 pp.).

* cited by examiner

Fig. 10

| Method | Parameter | Parameter | Expected Return Value | | | |
|---|---|---|---|---|---|---|
| Add ▽ | num1: 1 | num2: 1 | Expected: 2 | Edit | Remove | Add another line |
| Add ▽ | num1: 400 | num2: 172 | Expected: 572 | Edit | Remove | Add another line |
| Sub ▽ | num1: 89075234 | num2: 89075233 | Expected: 1 | Edit | Remove | Add another line |
| Sub ▽ | num1: 379 | num2: 7 | Expected: 872 | Edit | Remove | Add another line |
| Mul ▽ | num1: 17 | num2: 2 | Expected: 34 | Edit | Remove | Add another line |
| Mul ▽ | num1: 20 | num2: 4 | Expected: 80 | Edit | Remove | Add another line |
| Divide ▽ | Numerator: 80 | Denominator: 10 | Expected: 8 | Edit | Remove | Add another line |
| Divide ▽ | Numerator: 4 | Denominator: 4 | Expected: 2 | Edit | | Add another line |

Start a new test   Finish 190, 192, 194, 196, 198

COMPUTER-IMPLEMENTED SYSTEM FOR GENERATING AUTOMATED TESTS FROM A WEB APPLICATION

TECHNICAL FIELD

This technology relates to software testing.

BACKGROUND

Programs developed in a software development process must be tested to determine errors and ensured functionality. Test programs are known to be created from code generated from a newly developed program. These existing programs function only for one programming language, and must be run on the same computer as the program that was used to develop the new program.

SUMMARY

A method for testing software includes creating a software program using a software development program that executes on a first computer. A source code file is generated from the software development program by the first computer. The source code file is transmitted to a second computer. This second computer is configured to execute a test generation program that is independent of the software development program. The test generation program is operable without coexisting on a computer with the software development program. The test generation program analyzes the source code to identify test parameters. The test generation program is executed to generate a test file from the source code file.

A system for generating a test file includes first and second computers. The first computer is configured to create a software program using a software development program, and to generate a source code file from the software development program. The second computer is configured to receive the source code file, and to execute a test generation program that is independent of the software development program. The test generation program is operable without coexisting on a computer with the software development program. The second computer is also configured to execute the test generation program to generate a test file from the source code file.

BRIEF DESCRIPTION OF THE DRAWINGS

FIG. 10 is a graphic representation of a parameter entry screen.

DETAILED DESCRIPTION

Figure 1:
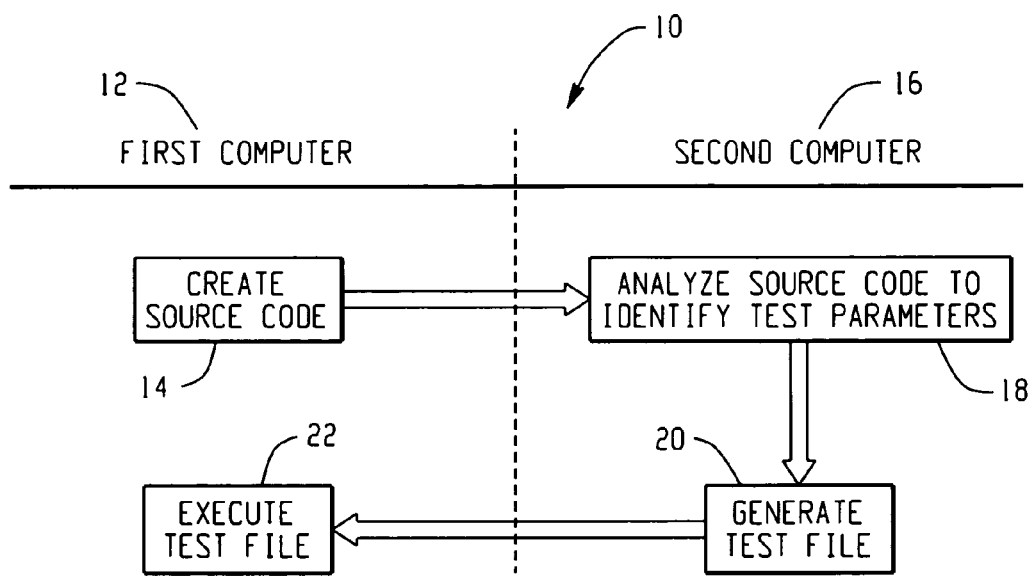
FIG. 1 is a block diagram of an example computer-implemented system for generating automated tests.

The elements shown in the drawings include examples of the structural elements recited in the claims. The illustrated elements thus include examples of how a person of ordinary skill in the art can make and use the claimed invention. They are described here to provide enablement and best mode without imposing limitations that are not recited in the claims.

The system 10 of FIG. 1 is an example of a computer-implemented system for generating automated tests. In this example the system 10 includes a first computer 12 and a second computer 16. The first computer 12 is configured to create source code 14 for a new computer program and to execute a test file 22 to test the source code 14. The second computer 16 is configured to analyze the source code 14 to identify test parameters 18 and to generate a test file 20 that tests the source code 14.

The first and second computers 12 and 16 operate independently of each other. However, the computers 12 and 16 are configured to communicate in some method, preferably over one or more networks, such as WANs, LANs, an intranet, the Internet, etc. The first computer 12 transfers source code to the second computer 16. The second computer 16 then analyzes the source code to identify parameters to be used in a test 18. After identifying the test parameters 18, the second computer 16 generates a test file 20, and then transfers the test file to the first computer 12. The first computer 12 executes the test file.

Figure 2:
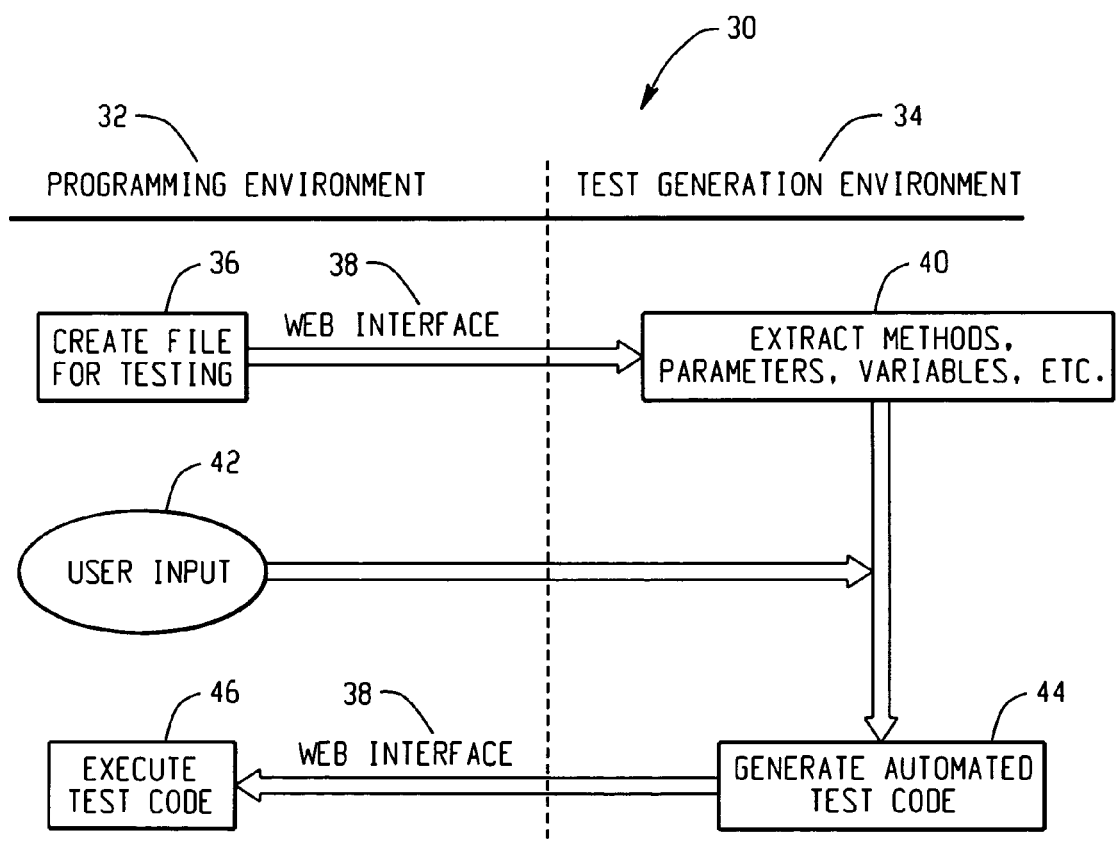
FIG. 2 is a block diagram of an example environment for a computer-implemented system for generating automated tests.

FIG. 2 is a block diagram of an environment 30 for a computer-implemented system for generating automated tests. The system provides for software tests to be generated automatically by the system, and not by a programmer. The environment 30 includes a programming environment 32 and a test generation environment 34. Programming tasks, such as creating a file 36 for testing and executing test code 46, are performed in the programming environment 32. Tasks relating to generating a test file, such as extracting methods, parameters or variables from a file 40 and generating automated test code 44, are performed within the testing environment 34.

A file 36 is created for testing within the programming environment 32. The file 36 may be source code that is generated by a software development program. Once created, the file 36 created for testing is transferred to the test generation environment 34 through an interface, such as a web interface 38.

Once the file 36 for testing is received by the test generation environment 34, methods, parameters, variables and other program components are extracted 40. A user can input data 42 from the extracted components while in the programming environment 32. The user may input the data 42 over a web interface to the test generation environment 34. Once the user input 42 is received, the test generation environment 34 generates automated test code 44. This test code 44 can then be transferred to the programming environment 32 where the test code 44 can be executed 46. One way that the test code 44 can be transferred is by downloading it from the testing environment to the programming environment via a web browser 38.

Figure 3:
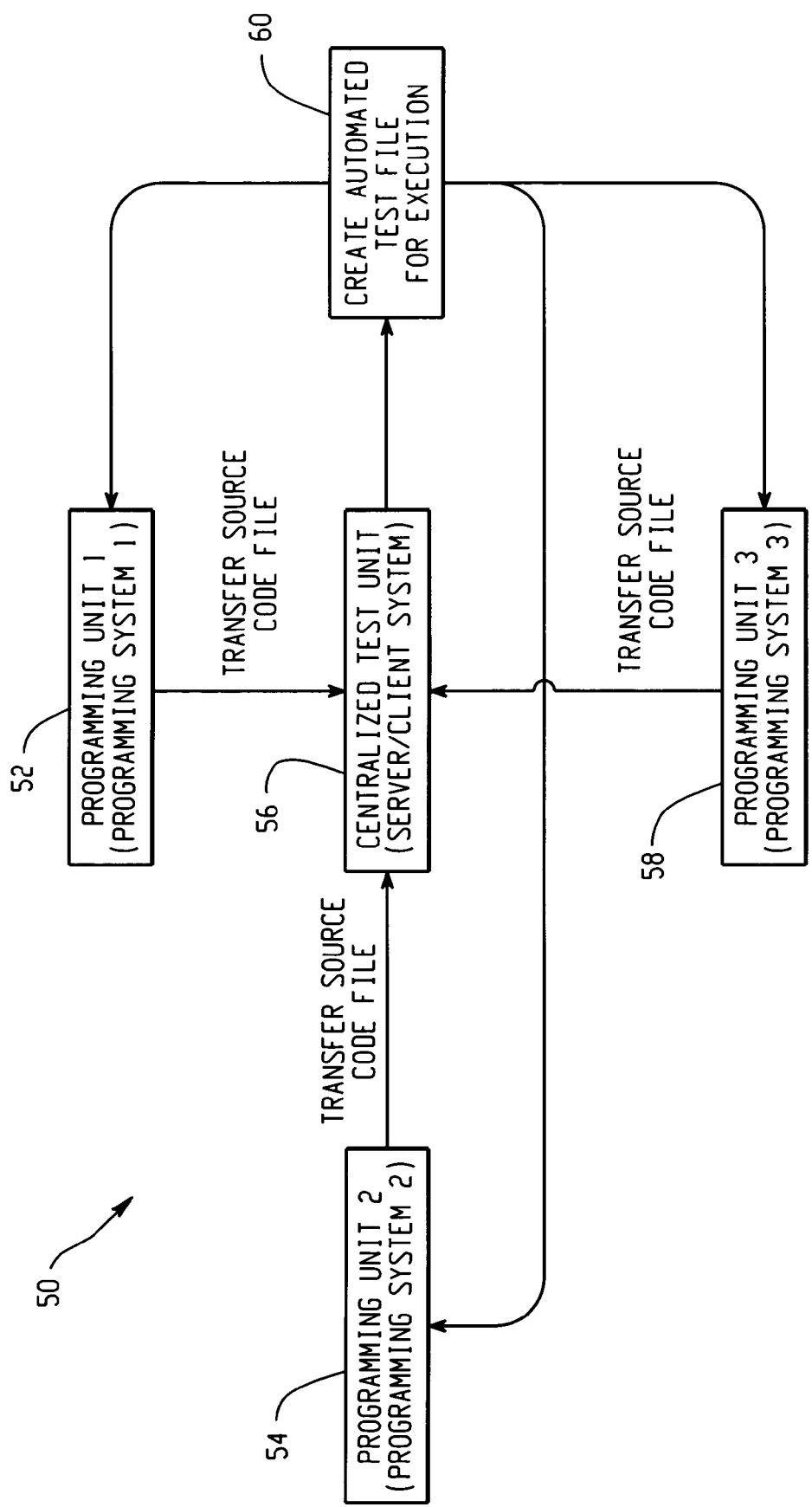
FIG. 3 is a block diagram of a process environment for a computer-implemented system for generating automated tests.

FIG. 3 is a block diagram of a process environment for a computer-implemented system for generating automated tests 50. The example environment 50 contains three programming units 52, 54 and 58. Each of the programming units 52, 54, and 58 may have a different function in the environment 50, such as different programming responsibilities or different programming systems. Each programming unit 52, 54 and 58 may also be responsible for programming in different programming languages. For example, the first programming unit 52 may create programs in C programming language, the second programming unit 54 may create programs in Java programming language, and the third programming unit 58 may create programs in C++ programming language.

A centralized test unit 56 is also present in the environment. The centralized test unit 56 is responsible for developing test files from source code developed in any of the programming units 52, 54 and 58. Each of the programming units 52, 54, and 58 can have the ability to communicate with the centralized test unit 56. The communication may take place over a network such as a LAN. The centralized test unit 56 is setup in such a way that it represents the server in a server client system, and each of the programming units 52, 54 and 58 contain clients that can access the centralized test unit 56.

The first programming unit 52 develops software code using programming system 1. The first programming unit 52 develops a source code file that can be transferred to the centralized test unit 56 Preferably, the first programming unit 52 transfers the source code file by uploading the source code file via a web browser to the server in the centralized test unit 56. The centralized test unit 56 creates an automated test file 60 based on user input for execution. The test file 60 is transferred back to the first programming unit 52 where it is executed. Preferably, the test file 60 is transferred by downloading it from a web browser. The second programming unit 54 and the third programming unit 58 operate in a similar method described here in conjunction with the first programming unit 52.

Figure 4:
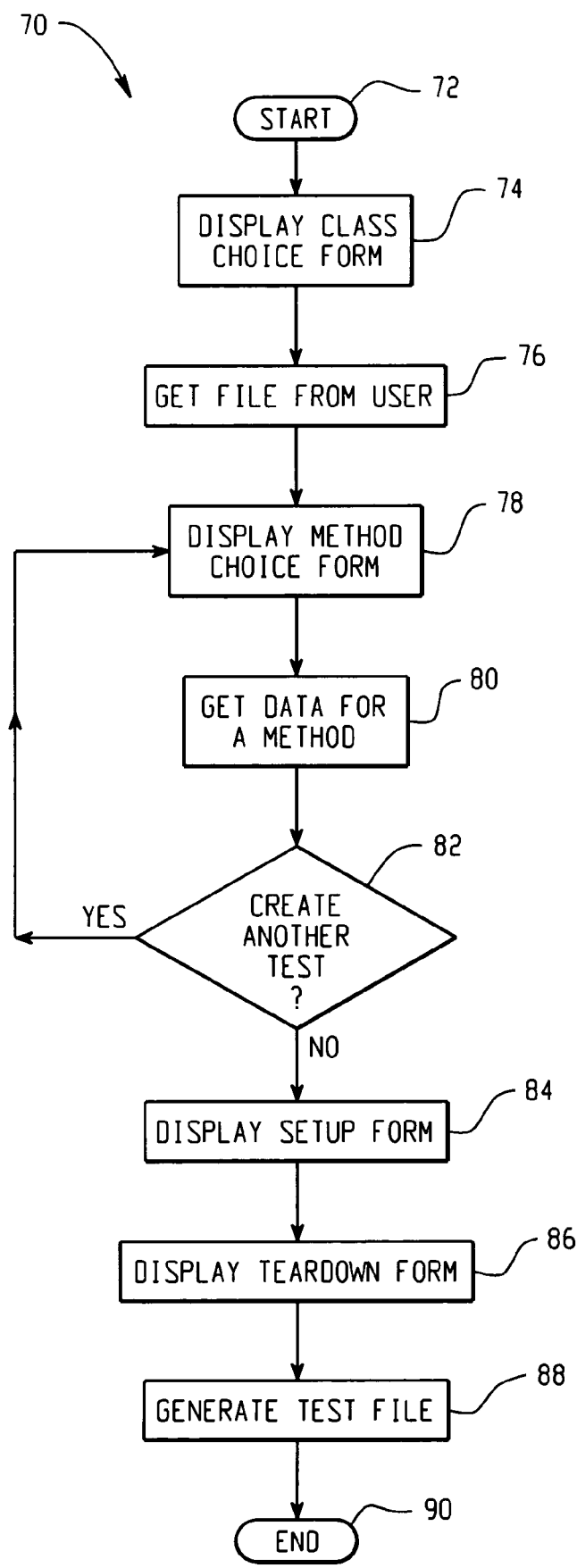
FIG. 4 is a flow chart of a method for creating a test file.

FIG. 4 is a flow chart of a method for creating a test file 70. It should be understood that similar to the other processing flows described herein, one or more of the steps and the order in the flow chart may be altered, deleted, modified and/or augmented and still achieve the desired outcome. The method starts at step 72. At step 74, a class choice form is displayed to the user. Next, at step 76, the user transfers a file to the system. The file can be a source code file generated from a program, and can be uploaded to the system through the class choice form. Alternatively, the file can be transferred from network locations rather than directly from the programming unit. In step 78, a method choice form is displayed to the user. The method choice form allows the user to select the method for which a test is to be generated. In step 80, the system receives data for the method. The user can enter the required parameters for the method chosen in step 80.

In step 82, it is determined whether another test should be created. If so, the method returns to step 78 and the method choice form is once again displayed. If another test should not be created then the method proceeds to step 84 where a setup form is displayed. The setup form accepts code entered by a user to be executed in the test file before the automatically generated test code. Next, in step 86, a teardown form is displayed. The teardown form accepts code entered by a user to be executed in the test file after the automatically generated test code. In step 88, and test file is generated, and the method ends at step 90.

Figure 5:
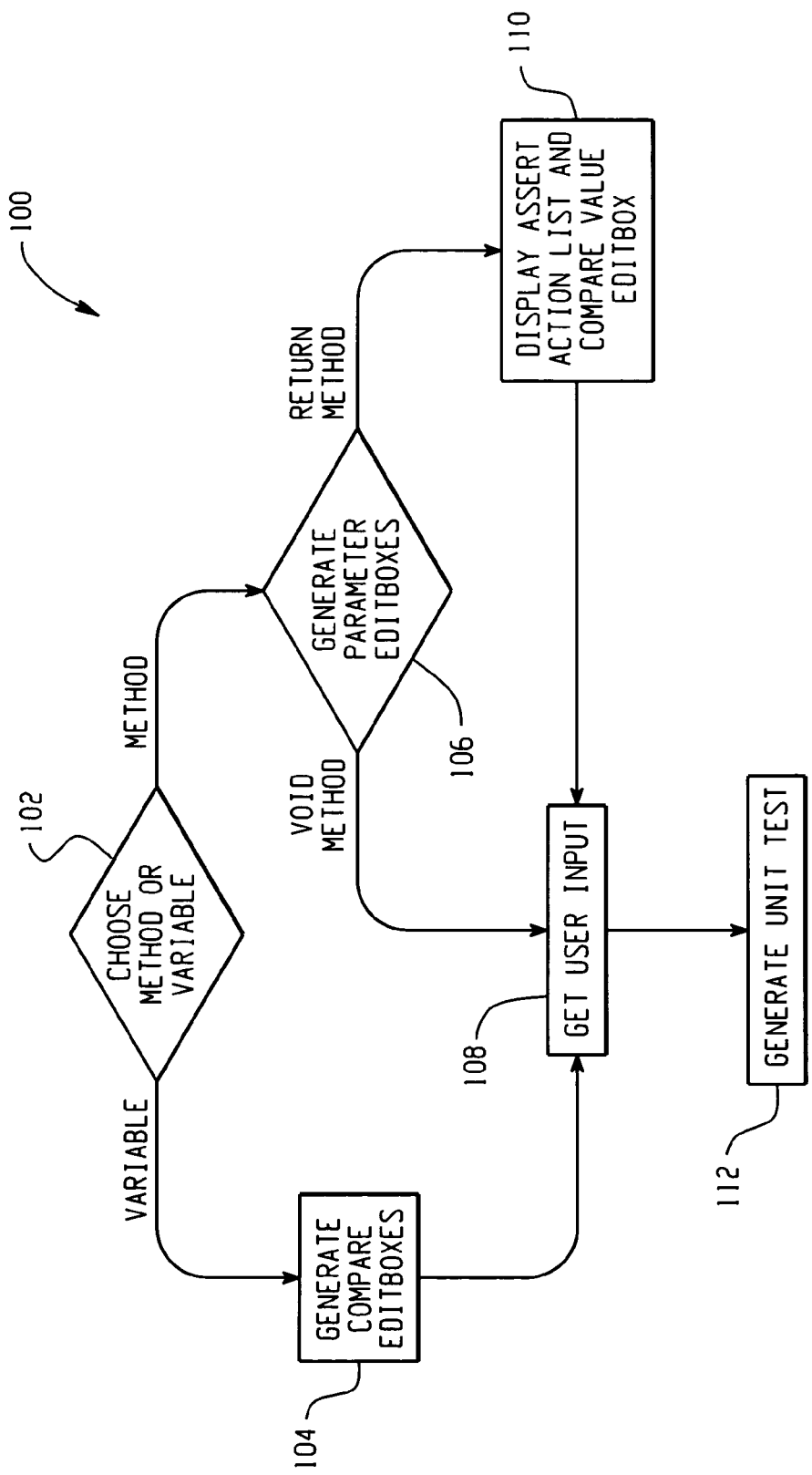
FIG. 5 is a block diagram of a method for generating a test line of code.

The block diagram shown in FIG. 5 is of a method for generating a test line of code 100. In step 102, the system prompts a user to choose either a method or a variable from a source code file. If a variable is chosen, then a compare edit box is generated at step 104. If a method is chosen, then parameter edit boxes are generated at step 106. If the method is a void method or if a compare edit box is displayed for variables, then at step 108, options are displayed to get user input. If the method is a return method, then an assert action list and compare value edit box is displayed at step 110. User input is received at step 108 from any of the generated edit boxes. Finally, at step 112, a test line of code is generated.

Figure 6:
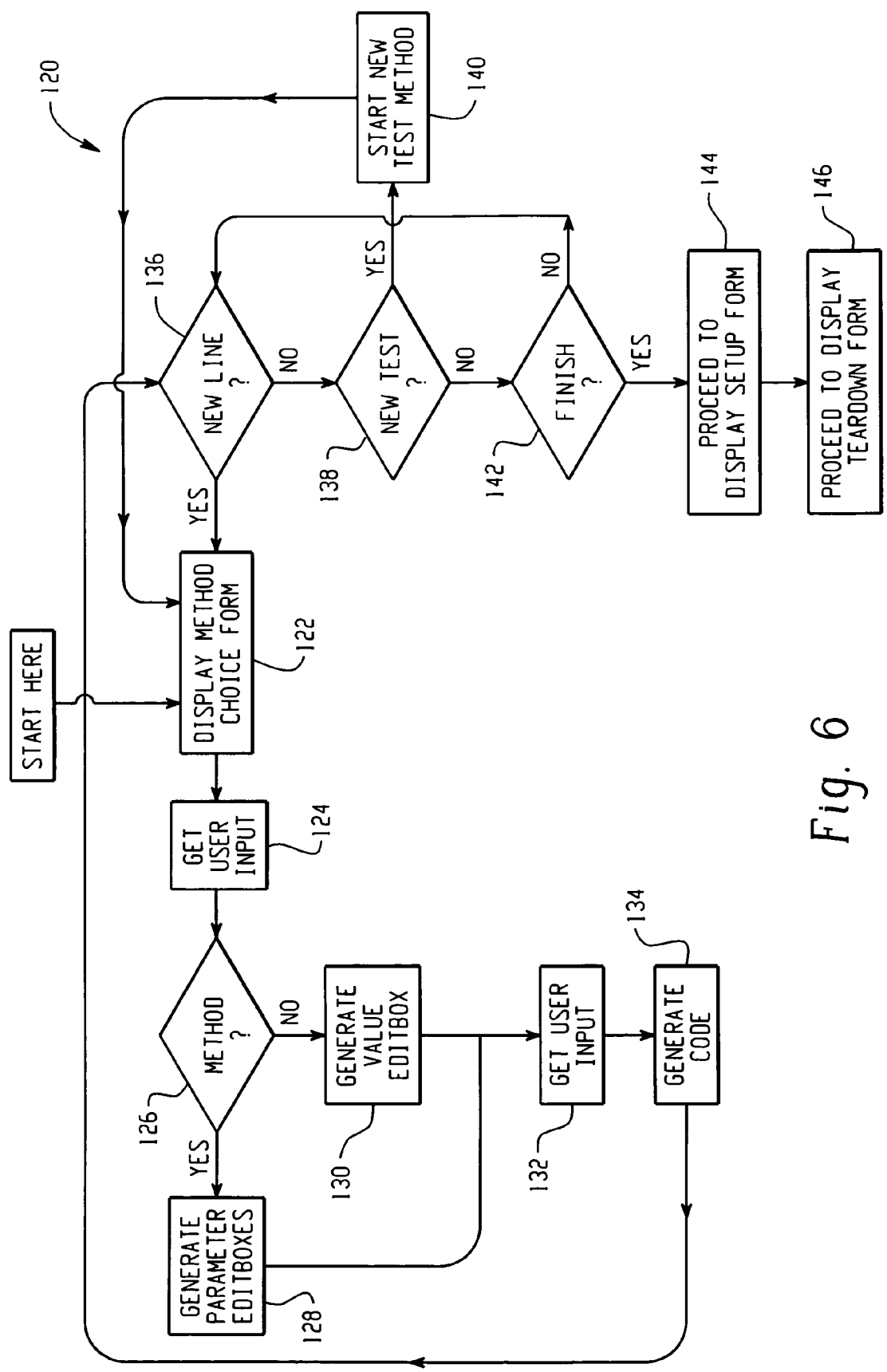
FIG. 6 is a block diagram of another method for generating a test file.

FIG. 6 is a block diagram of a method 120 for generating a test file. The method begins at step 122 where a method choice form is displayed. In step 124, the user selects either a method or a variable in the program that will be tested. The method then moves to step 126 where the program will determine whether a variable or a method was selected in step 124. If it was a method, then parameter editboxes are generated in step 128. However, if a variable was selected in step 124, then a value editbox will be generated in step 130.

The method next moves to step 132, where a user will input either parameters into the parameter editboxes or values into the value editbox. Once all of the parameters or values have been entered, code is generated in step 134.

Next, it is determined whether a new line of code (new assertion statement) should be added in step 136. If a new line of code (new assertion statement) should be added, then the method returns to step 122. If no new line of code should be added, then the method moves to step 138 where it is determined whether or not a new test should be generated. If a new test should be generated, then the method moves to step 140 where a new test method is started, and back to step 122.

If no new test should be generated, then the method moves to step 142 where it is determined whether this particular test file is finished. If it is not finished, the method returns to step 136. If the test file is finished, then the method proceeds to step 144, where the setup form is displayed, and finally to step 146, where the teardown form is displayed.

Figure 7:
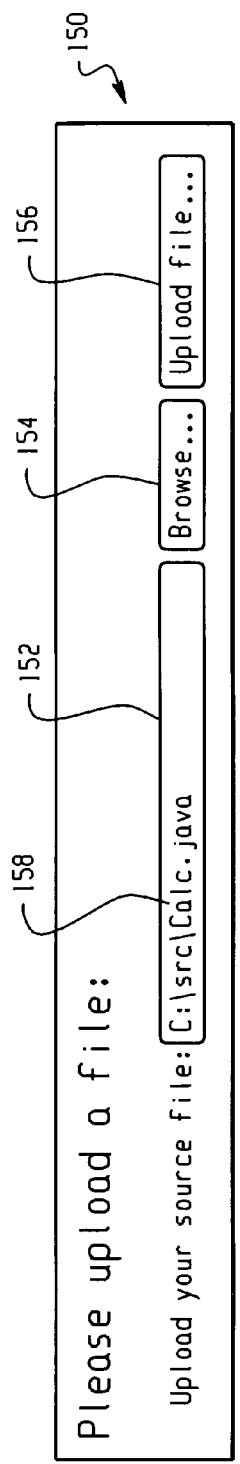
FIG. 7 is a representation of an upload screen.

FIGS. 7-12 are representations of screens associated with the computer-implemented system for generating automated tests from a web application. FIG. 7 is a graphic representation of an upload screen 150. The Upload screen includes a text box 152, a Browse button 154 and an Upload file button 156.

When a user clicks the Browse button 154, the system gives them a screen from which they can select source code that was previously generated. The name of the file selected by the user is then displayed in the text box 152. In this example, the file path and name is displayed as C:\src\Calc.java 158. The contents of the Calc.java source code for the example illustrated by FIGS. 7-12 are:

```
public class Calc{
    public int add(int num 1, int num2) {
        return num1+num2;
    }
    public int subtract(int num1, int num2) {
        return num1−num2;
    }
    public int multiply(int num1, int num2) {
        return num1*num2;
    }
    public int divide(int numerator, int denominator) {
        return numerator/denominator;
    }
}
```

When the file name 158 is displayed in the text box 152, the user can then click the upload file button 156. The upload file button 156 will cause the file associated with the filename 158 to be uploaded from the computer the user is currently working on to the computer that runs the system that will generate the test file.

Figure 8:
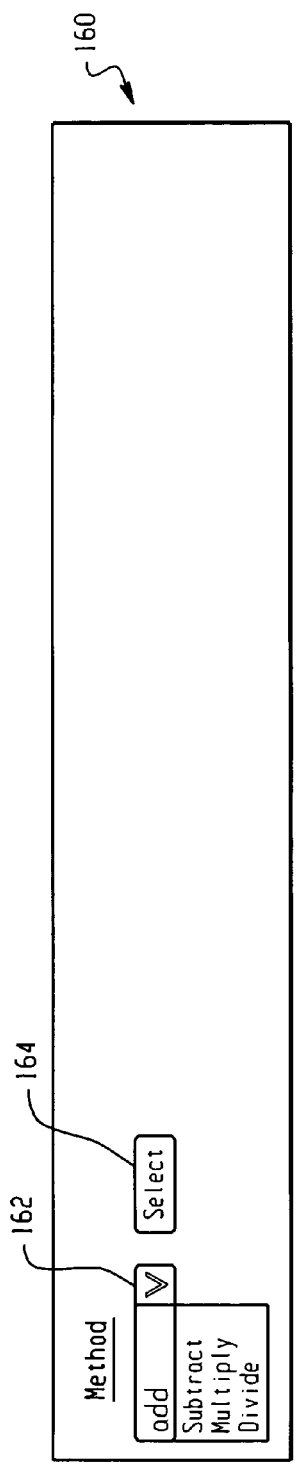
FIG. 8 is a graphic representation of a method selection screen.

FIG. 8 is a graphic representation of a method selection screen 160. The method selection screen 160 can include a dropdown box 162 and a select button 164. The dropdown box 162 lists the methods and variables extracted from the source code file that was uploaded by the user from the upload file screen shown in FIG. 7. In this example, the dropdown box 162 is displaying the four methods "add," "subtract," "multiply" and "divide." A user can select a method from the dropdown box 162, and then can click the select button 164. The select button 164 sends the selection to the system, which generates a screen similar to the representation in FIG. 9.

Figure 9:
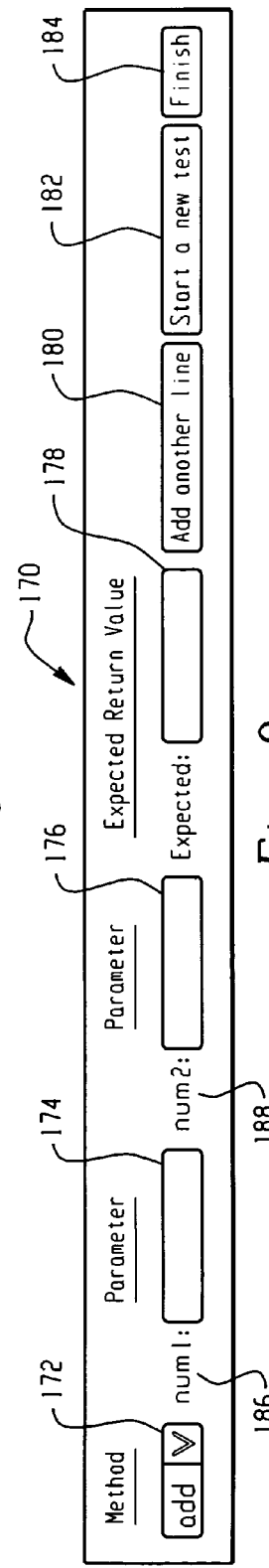
FIG. 9 is a graphic representation of a parameter input screen.

FIG. 9 is a graphic representation of a parameter input screen 170. The parameter input screen 170 includes a dropdown box 172, two parameter entry text boxes 174 and 176, an expected return value text box 178, an add another line button 180, a start a new test button 182 and a finish button 184.

The dropdown box 172 includes a listing of the methods that were extracted from the source code. The system will generate lines of code to test the method shown in the dropdown box 172. The text boxes 174, 176 and 178 are generated from the method selected from the dropdown box 172. The unique parameter labels extracted from the source code for the selected method are displayed as labels for the text boxes 174 and 176. In this example, the two parameters for the "add" method are num1 186 and num2 188. The user can enter values to test the "add" method in text boxes 174 and 176.

A user enters the value expected when the method is tested in the expected return value text box 178. The add another line button 180 generates another line similar to the one shown in FIG. 9. A new method can be chosen and new parameters entered for additional lines of test code within a single test method. The start a new test button 182 will start a new test method. The finish button 184 is pressed when parameters are selected for all desired methods.

FIG. 10 is a graphic representation of a parameter entry screen 190. This representation is the result of adding a total of 8 method entries to the screen of FIG. 9. In this representation, there are two entries for one test of the "add" method 192, two entries for one test of the "subtract" method 194, two entries for one test of the "multiply" method 196, and two entries for one test of the "divide" method 198. More than one test for a single method is generated with the "add another line" button.

Figure 11:
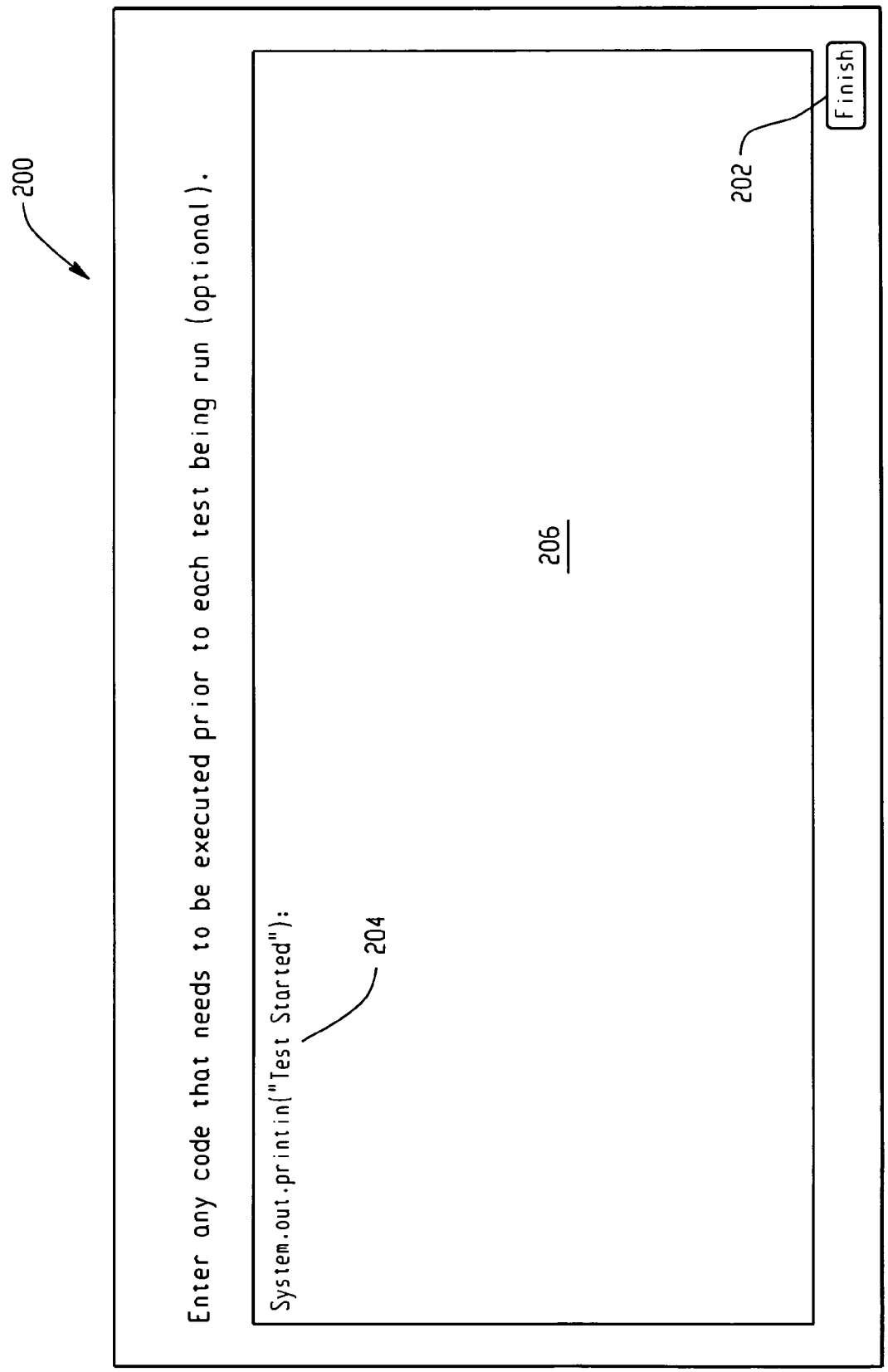
FIG. 11 is a graphic representation of a setup code entry screen.

FIG. 11 is a graphic representation of a setup code entry screen 200. The setup code entry screen includes a text box 206 and a finish button 202. The setup code entry screen 200 is provided for a user to enter code 204 that will be run before the test code that is automatically generated by the system. In this example, the entered code is:
System.out.println("Test Started");
Any additional code can be added. Particularly, a user can add setup code that is unique to a particular programming language. When the user has completed entering the setup code 204, pressing the finish button 202 will indicate to the system that they are finished.

Figure 12:
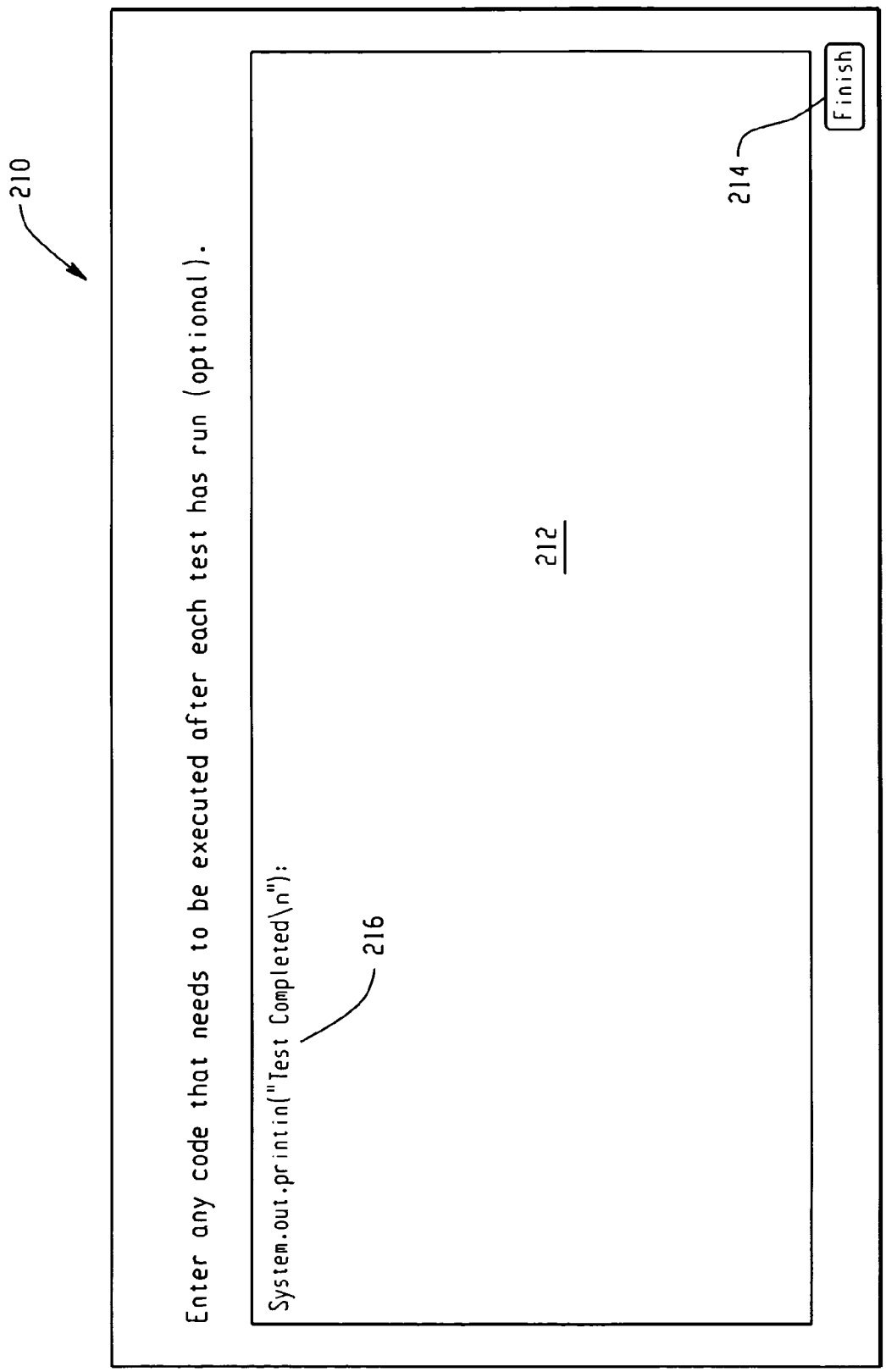
FIG. 12 is a graphic representation of a cleanup code entry screen.

FIG. 12 is a graphic representation of a cleanup code entry screen 210. The cleanup code entry screen 210 includes a text box 212 and a finish button 214. The cleanup code entry screen 210 is provided for a user to enter code 216 that will be run after the test code that is automatically generated by the system. In this example, the entered code is:
System.out.println("Test Completed\n");
Any additional code can be added. Particularly, a user can add setup code that is unique to a particular programming language. When the user has completed entering the cleanup code 216, pressing the finish button 214 will indicate to the system that they are finished.

After the cleanup code is entered, the system generates a test file based on the selections and entries made by the user. In the example shown above, the following code is generated:

```
import junit.framework.TestCase;
public class TestCalc extends TestCase {
    private Calc myCalc;
    public void setUp( ){
        myCalc=new Calc( );
        System.out.println("\nTest Started");
    }
    public void tearDown( ){
        System.out.println("Test Completed\n");
    }
    public void testAdd( ){
        assertEquals(2,myCalc.add(1,1));
        assertEquals(572,myCalc.add(400,172));
    }
    public void testSubtract( ){
        assertEquals(1,myCalc.subtract(89075234,89075233));
        assertEquals(872, myCalc.subtract(879,7));
    }
    public void testMultiply( ){
        assertEquals(34, myCalc.multiply(17,2));
        assertEquals(80, myCalc.multiply(20,4));
    }
    public void testDivide( ){
        assertEquals(8,myCalc.divide(80,10));
        assertEquals(2,myCalc.divide(4,2));
    }
}
```

In this code, the "assertEquals" method is used to test the selected methods with the parameters entered in the screens discussed above. For example, for the line of code "assertEquals(2,myCalc.add(1,1))," the 2 is the expected return value, the "myCalc.add" is the method in the source code file that is to be tested, and the "1" and "1" are the two entered parameters to be added by the method.

Once the code above is generated, it can be downloaded by a user onto a client, and run using testing software that is traditionally used to test files of this sort.

This written description sets forth the best mode of carrying out the invention, and describes the invention to enable a person of ordinary skill in the art to make and use the invention, by presenting examples of the elements recited in the claims. The patentable scope of the invention is defined by the claims and may include other examples that occur to those skilled in the art. Such other examples, which may be available either before or after the application filing date, are intended to be within the scope of the claims if they have elements that do not differ from the literal language of the claims, or if they have equivalent elements with insubstantial differences from the literal language of the claims.

It is further noted that the systems and methods described herein may be implemented on various types of computer architectures, such as for example on a single general purpose computer or workstation, or on a networked system, or in a client-server configuration, or in an application service provider configuration.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

What is claimed is:

1. A method for testing software, comprising:
    creating a software program using a software development program that is executed on a first computer;
    generating a source code file from the created software program, the source code file being generated by the first computer;
    transmitting the source code file to a second computer that is configured to execute a test generation program that is independent of the software development program, wherein the test generation program is operable without coexisting on a computer with the software development program, and wherein the test generation program is configured to generate test files from source code written in each of a plurality of different programming languages, generating a test file from the source code comprising:
        automatically extracting a method from the source code file, wherein the method returns a return value;
        automatically analyzing the extracted method to identify variables from the extracted method;
        receiving test values for the identified variables from the extracted method;
        receiving an expected return value for the method; and
        generating a test file that commands execution of the method using the test values and reports whether the return value of the method matches the expected return value;
    executing the test generation program to generate a test file from the source code file.

2. The method of claim 1, further comprising:
    receiving the test file with the first computer; and
    executing the test file with the software development program.

3. The method of claim 2, wherein the steps of creating a software program and generating a source code file are performed by a programming unit configured to write and execute programming code, and the steps of receiving the test file and executing the test file are performed by a testing unit configured to generate test cases via the code by the programming unit.

4. The method of claim 1, wherein the testing unit runs the test generation program with user provided input from a web browser.

5. The method of claim 1 further comprising the steps of:
    receiving setup code and teardown code by the second computer; and
    including the setup code and the teardown code in the test file generated from the source code file.

6. A method for testing in a software development environment that includes a programming environment for developing a software program using a software development platform and a test generation environment for testing software programs using a software testing platform, comprising:
    creating a software program using the software development platform that executes on a first computer;
    generating a source code file from the software program for testing, the source code file generated by the software development platform that executes on the first computer;
    receiving the source code file with a second computer, the second computer executing a software testing platform that is independent of the software development platform, wherein the software testing platform is operable without coexisting with the software development platform, and wherein the test generation program is configured to generate test files from source code written in each of a plurality of different programming languages, generating a test file from the source code comprising:
        automatically extracting a method from the source code file, wherein the method returns a return value;
        automatically analyzing the extracted method to identify variables from the extracted method;
        receiving test values for the identified variables from the extracted method;
        receiving an expected return value for the method; and
        generating a test file that commands execution of the method using the test values and reports whether the return value of the method matches the expected return value;
    using the software testing platform to generate a test file from the source code file.

7. A system for testing software, comprising:
    a first computer configured to create a software program using a software development program, and to generate a source code file from the software program for testing;
    a second computer configured to receive the source code file, to execute a test generation program independent of the software development program, wherein the test generation program is operable without coexisting on a computer with the software development program and wherein the test generation program is configured to generate test files from source code written in each of a plurality of different programming languages, and to execute the test generation program to generate a test file from the source code file, generating a test file from the source code comprising:
        automatically extracting a method from the source code file, wherein the method returns a return value;
        automatically analyzing the extracted method to identify variables from the extracted method;

receiving test values for the identified variables from the extracted method, receiving an expected return value for the method; and generating a test file that commands execution of the method using the test values and reports whether the return value of the method matches the expected return value.

8. The system of claim 7, wherein the second computer is accessed using a web interface.

9. A method for testing a software program created using a software development program that is executed on a first computer where the first computer generates a source code file from the created software program, comprising:

receiving the source code file at a second computer that is configured to execute a test generation program that is independent of the software development program, wherein the test generation program is operable without coexisting on a computer with the software development program, and wherein the test generation program is configured to generate test files from source code written in each of a plurality of different programming languages, generating a test file from the source code comprising:

automatically extracting a method from the source code file, wherein the method returns a return value;

automatically analyzing the extracted method to identify variables from the extracted method;

receiving test values for the identified variables from the extracted method;

receiving an expected return value for the method; and generating a test file that commands execution of the method using the test values and reports whether the return value of the method matches the expected return value;

executing the test generation program to generate a test file from the source code file.

\* \* \* \* \*

UNITED STATES PATENT AND TRADEMARK OFFICE
CERTIFICATE OF CORRECTION

| | | |
|---|---|---|
| PATENT NO. | : 7,913,229 B2 | |
| APPLICATION NO. | : 11/522710 | |
| DATED | : March 22, 2011 | |
| INVENTOR(S) | : Squires et al. | |

It is certified that error appears in the above-identified patent and that said Letters Patent is hereby corrected as shown below:

In column 9, line 2, delete "method," and insert -- method; --.

Signed and Sealed this
Tenth Day of May, 2011

David J. Kappos
*Director of the United States Patent and Trademark Office*